Patented Sept. 14, 1926.

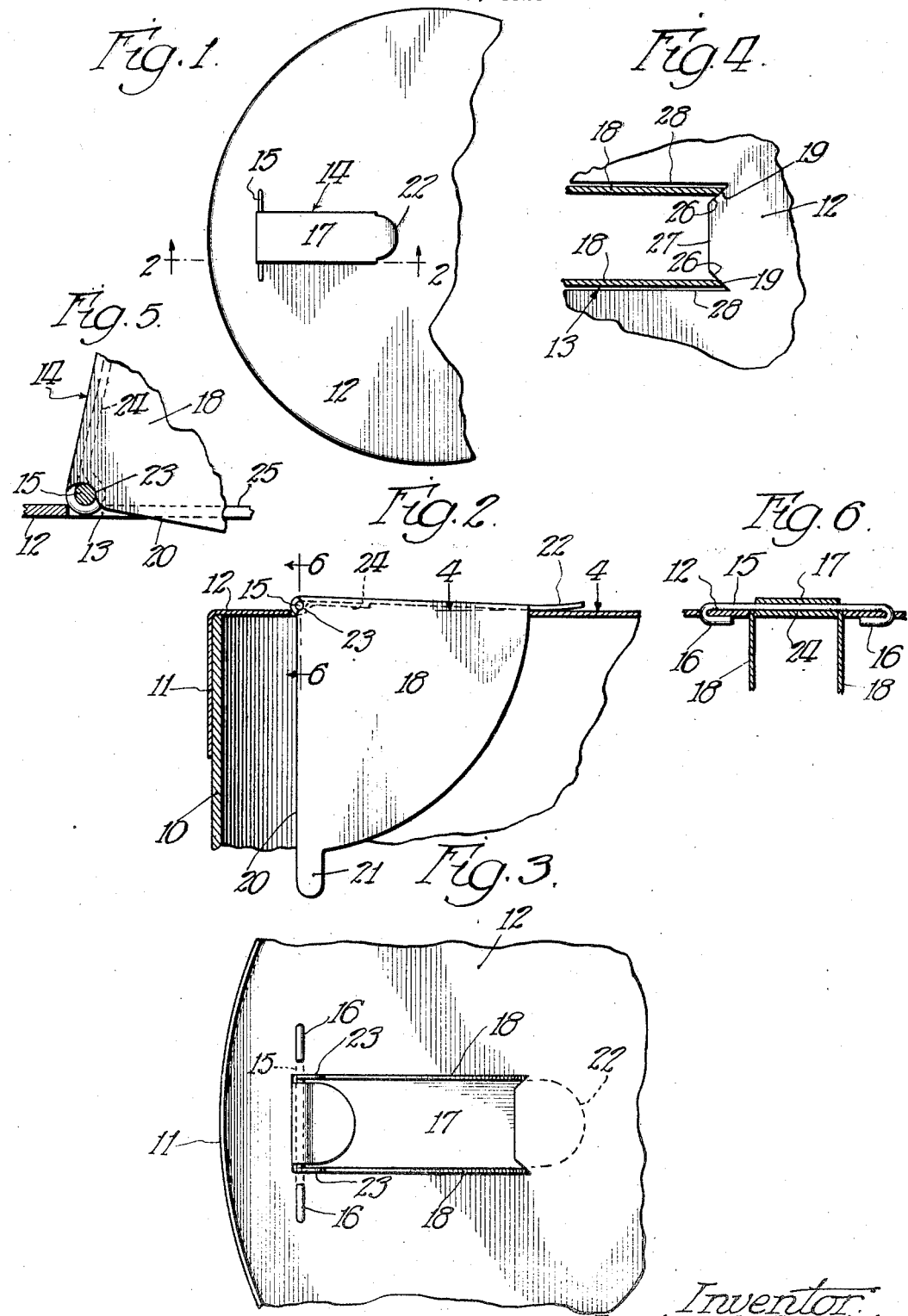

1,599,536

UNITED STATES PATENT OFFICE.

LESTER L. LADD, OF LOCKPORT, ILLINOIS.

POURING-SPOUT CAN.

Application filed February 5, 1925. Serial No. 7,012.

My invention relates to receptacles and more particularly to a receptacle provided with a pouring spout.

It is a purpose of my invention to provide a receptacle made of paper or similar fibrous material with a closure member that is adapted to be moved to such a position as to act as a spout to pour the contents of the receptacle in a desired direction and to provide new and improved means for securing said closure member in position thereon.

It is another purpose of the invention to provide a spout on a receptacle so that the same can act as a closure member and as a pouring spout by mounting the same pivotally thereon. The means for mounting the spout pivotally on the receptacle preferably comprises a hinge pin or pivot member that is secured to the wall portion of said receptacle having an opening therein for receiving a spout at points spaced from the opening preferably by stapling.

It is still another purpose of the invention to provide a receptacle with a pouring spout pivotally mounted on an end wall thereof, said spout being provided with side wall portions and being so mounted that the inner edges of the side wall portions will always lie inwardly of the outer face of the wall portion to which the spout is pivoted, no matter what the position of the spout. This prevents leakage of the contents of the receptacle between the inner edge of the spout and the wall portion of the receptacle adjacent thereto.

It is still a further purpose of the invention to provide guiding means for the spout in the adjoining wall portion of the receptacle. The receptacle is preferably provided with an opening having recesses or notches in the edge thereof adjacent the edges of the wall portions to thus hold the wall portion substantially in parallelism as the spout is moved from pouring to closing position and vice versa. The edges of the side walls are preferably cut on a curve such that the distance of the edges from the pivot is greater when the spout is in pouring position than when closed, whereby the edges bind in notches or recesses in the edge of the opening of the wall of the can or receptacle to thus hold the spout in open position.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:—

Fig. 1 is a fragmentary end view of a receptacle embodying my invention;

Fig. 2 is an enlarged sectional view taken on the line 2—2 of Fig. 1;

Fig. 3 is a fragmentary elevational view of my invention and the adjoining end wall portion of the receptacle looking outwardly from the interior of the receptacle;

Fig. 4 is a fragmentary sectional view taken on the line 4—4 of Fig. 2;

Fig. 5 is an enlarged fragmentary section of a portion of the spout and the adjoining wall portion of the receptacle showing the spout in open position; and Fig. 6 is an enlarged sectional view taken on the line 6—6 of Fig. 2.

Referring in detail to the drawings, in Fig. 2 is shown a paper can having a body portion 10 and a cover 11 providing an end wall 12 for said can. Said end wall 12 is provided with an opening 13 for receiving the spout 14, said spout serving as a closure for said opening as will be evident from Fig. 1. The spout 14 is pivotally mounted on the end wall portion 12 by means of the hinge pin or pivot pin 15 which is secured in place by stapling the same to the end wall 12, the ends 16 thereof being clinched over on the inside face of the end wall 12 in the usual manner in which such members are stapled to members of sheet material. When the pin 15 has been stapled to the end wall 12, as described above, the same will extend across the opening 13.

The spout 14 is provided with a top wall or web 17 and with side wall portions 18 extending substantially perpendicularly to the web portion 17 so that said members 18 lie substantially in parallelism to each other. The side walls 18, as will be evident from Fig. 2, are provided with curved edges 19 and it will be obvious that the edge 19 is nearer the pivot pin 15 adjacent the web portion 17 than adjacent the inner edge 20 of said wall 18. Projections or stop lugs 21 are provided at the inner edges 20 of the walls 18, the same engaging the inner face of the end wall 12 when the spout is in open or pouring position as is clearly evident. The web portion 17 is provided with a forward extension or lip 22 projecting over the wall portion 12 and being tilted slightly away from said wall portion whereby the same may be readily engaged by the finger nail or any other sharp object to move the spout 14 outwardly away from the wall portion 12.

The side wall portions 18 of the spout 14 are provided with notches or recesses 23 and an ear or lip 24 is provided adjacent said notches 23, said ear or lip 24 being an extension of the web portion 17. The ear or lip 24 extends substantially in alignment with the edge 20 prior to attaching the spout 14 to the receptacle. To place the spout in position, the spout is merely passed through the opening 13 with the ear 24 over the pin 15 after which the ear is bent around by hand or in any other suitable manner into the position shown in Figs. 2 and 5, the pin 15 being positioned in the notches 23 to thus readily position the pin in proper relationship to the spout in assembling the device and also for another important purpose which will now be brought out.

Due to the fact that the pin 15 lies on top of the end wall 12, which end wall is normally the end wall of the cover of the receptacle, it is necessary that the edge 20 lie inwardly from the pivot pin 15 at all times so that said edge 20 will lie below the outer face 25 of the wall portion 12, as clearly shown in Fig. 5, when the member 14 is in pouring or open position, as otherwise (especially if the material within the can or receptacle is finely divided), some of the contents of the can might pass through the crack that would exist, between the edge 20 and the outer face 25, causing a leakage of the contents of the receptacle adjacent the spout.

In order that the member 14 will be guided in its movement with the side walls 18 thereof always substantially in parallelism, the opening 13 is provided with inclined edges 26 which converge toward the center 27 of the one end edge of the opening 13 and lie at an acute angle to the side edges 28 of said opening, this being clearly shown in Fig. 4. It will be seen that due to the provision of the edges 26, the walls 18 will always be wedged outwardly in substantially parallelism to the side edges 28 of the opening 13 and also it will be evident from Fig. 4 that due to the curvature of the edges 19, the same will wedge into the corners between the edges 26 and 28 to thus hold the spout 14 in open position, the opening being slightly smaller than the largest portion of the side walls 18.

Having thus described my invention what I desire to claim and secure by United States Letters Patent is:—

1. In a device of the character described, a flat wall portion of fibrous material having an opening therein, a spout mounted in said opening and means for pivotally securing said spout to said wall portion comprising a hinge pin lying flatly against said wall portion and engaging said spout, and having ends passing through said wall portion and bent over on the inner face thereof.

2. In a device of the character described, a wall portion having an opening therein, a spout mounted in said opening and means for pivotally securing said spout to said wall portion comprising a hinge pin secured to said wall portion, said spout having side walls provided with recesses pivotally receiving said hinge pin, and an elongated hook-like ear on said spout hooked around said hinge pin with its free end projecting toward the free end of the spout to maintain said pin in said recesses.

3. In a device of the character described, a wall portion having an opening therein, a spout mounted in said opening, said spout having side walls projecting inwardly therefrom and means for pivotally securing said spout to said wall portion, each of said side walls having an arc shaped edge curved about the pivotal axis of said spout as a center, the radius of the arc being greater at an intermediate portion than at least one of the ends of the arc, said wall portion having notches therein receiving the edges of said side walls to guide the same, and said edges binding in said notches to hold the spout in an intermediate position.

4. In a device of the character described, a wall portion having an opening therein, a spout mounted in said opening and means for pivotally securing said spout to said wall portion comprising a hinge pin secured to said wall portion, said spout having side walls provided with portions pivotally receiving said hinge pin and an elongated ear on said spout hooked around said hinge pin with its free end projecting toward the free end of said spout to retain said pin in position against said portions of said side walls and form, with said portions, a bearing for said pin.

In witness whereof, I hereunto subscribe my name this 23 day of January, A. D. 1925.

LESTER L. LADD.